2,946,757

QUATERNARY AMMONIUM ION EXCHANGE RESINS OF IMPROVED PROPERTIES

George B. Butler, 1722 NW. 11th Road, Gainesville, Fla., and Robert L. Goette, M-3 King Haigler Apts., Camden, S.C.

No Drawing. Filed May 2, 1955, Ser. No. 505,530

10 Claims. (Cl. 260—2.1)

This invention relates to organic compounds and more particularly to quaternary ammonium compounds. It also relates to new and improved products useful for removing anions from solutions, and a process for preparing same. The materials so produced show distinct improvement over hitherto known products in that they possess structural characteristics which render them more readily regenerated for use as ion exchange resins. Furthermore, such materials possess higher ion exchange capacities than hitherto known materials which possess the above mentioned properties.

In accordance with our invention, we prepare the new quaternary ammonium salts by treating diallyl amine with 1,4-dichlorobutene-2 or 1,4-dibromobutene-2 to produce 1,4-bis-(diallylamino)-butene-2, followed by treatment of this amine with alkyl, alkenyl, aralkyl, or aralkenyl halides. Although, from a capacity standpoint, it is advantageous to use as quaternizing groups those compounds of lowest molecular weight, other factors such as cost, reactivity, etc., are important. While the examples included herein appear to give the most desirable results, it is to be understood that the invention is not limited to use of the specific intermediates referred to in these examples. Polymers and copolymers of these quaternary ammonium salts possess the properties of anion exchange resins. Because of the presence of the butene-2 double bond which does not lose its identity in the polymerization, these polymers and copolymers are markedly more readily converted to the hydroxide form from the salt form than other known materials of this type. This property of the resin constitutes a distinct improvement since regeneration of strongly basic quaternary ammonium resins has in the past been very difficult.

This invention particularly provides cross-linked water insoluble polymers of symmetrically-substituted quaternary ammonium salts of the structure:

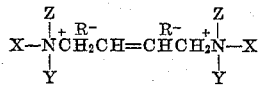

wherein X stands for allyl radicals, Y and Z stand for lower alkyl or allyl radicals, and R⁻ is a chloride or bromide ion, said polymers being suitable for use as ion exchange resins capable of rapid regeneration rates and being characterized by polymerization and cross-linking through the ethylenic double bonds of the allyl groups, the butene double bonds remaining intact. These polymers include homopolymers of such salts and copolymers of the salts with different ethyleneically unsaturated quaternary ammonium compounds.

While use of 1,4-bis-(diallylamino)-butene-2 is preferred as an intermediate for preparation of the monomeric quaternary ammonium salts, it is not essential. 1,4-bis-(dimethylamino)-butene-2 and 1,4-bis-(diethylamino)-butene-2, as well as other members of this series of organic compounds can serve. Such derivatives when quaternized with alkenyl or aralkenyl halides possess properties which permit them to produce copolymers which possess the pronounced property of decreased basicity which permits their more ready regeneration.

Although it has not been definitely established why polymers and copolymers of quaternary ammonium salts of 1,4-diamino-butene-2 possess decreased basic properties, thus permitting the very desirable more rapid regeneration rate, this does not affect the utility or novelty of the new products.

Results of polymerization studies of 1,4-diamino-butene-2 derivatives containing two, four and six allyl groups in addition to the butene-2 double bond show that those compounds containing only two double bonds, e.g., bis-(allyldimethylammonium)-butene-2 dibromide, produce water-soluble polymers, while those containing four or six double bonds result in the formation of water-insoluble polymers. Since previous results have shown that water-insoluble polymers result from those compounds containing three or more double bonds, the failure of bis-(allyldimethylammonium)-butene-2 dibromide to produce a water-insoluble polymer is conclusive evidence that the butene-2 double bond did not enter into the polymerization. This is substantiated by the pronounced effect of this double bond on the regeneration rates of the resulting polymers as discussed below. Even though those monomers containing only two allyl groups would not produce water-insoluble polymers suitable for further study alone, their copolymers with monomers containing three or more allyl groups were prepared.

It might be expected that this residual double bond would have an effect on the basic properties of the quaternary ammonium center due to its electrophilic nature. This effect appears to be analogous to that which results in a decrease in the ionization constant of an amine when, e.g., a propyl group is replaced by an allyl group. Dipropylamine has $K_b = 1.02 \times 10^{-3}$ at 25°, and diallylamine has $K_b = 3.12 \times 10^{-6}$ at 25°. This effect could conceivably be the result of one or both of two mechanisms: (1) the electrophilic group decreases electron density in the immediate vicinity of the nitrogen atom, thus increasing the electropositive nature of this atom, resulting in decreased mobility of the hydroxyl ion, or (2) the C—N bond between the allyl group and the nitrogen may possess a certain degree of ionic character, as the result of resonance, thus increasing the electropositive nature of the nitrogen center. This latter effect would result in a more complete distribution of the positive charge over the entire ion, and likewise decrease the mobility of the hydroxyl ion. Since a quaternary ammonium hydroxide, according to present accepted ideas of structure, cannot exist in a non-ionized state except by hydrogen bonding through some mechanism such as that suggested below, this observed decrease in basic properties in polymers containing the butene-2 double bond must be attributed to the presence of this double bond. This decrease must be explained either on the basis of decreased mobility of the hydroxyl ion by one of the above mechanisms, or by hydrogen bonding. Since the quaternary ammonium structure has no proton attached directly to the nitrogen atom as in the ammonium and alkyl ammonium ions, hydrogen bonding could result only between the oxygen of the hydroxyl ion and a hydrogen atom attached through carbon. Since it has been shown that compounds such as allylbenzene react to produce an ionic sodium derivative, it is likely that hydrogen bonding could be a factor in the manner

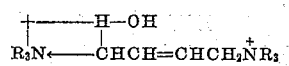

Further evidence is available for the partial ionic character of the methylene hydrogen atoms in allyl groups in the extensive work on allylic arrangements.

Since it has previously been shown that the swelling coefficient is an important factor in the ion exchange rates of quaternary ammonium polymers, this factor was considered in these studies. For comparison, samples of polymers were selected which had approximately equal swelling coefficients, the polymer containing the butene-2 double bond having a slightly lower value. The polymer having the higher swelling coefficient, all other factors being equal, would be expected to have the higher exchange rate; however, in these studies, the reverse was true by two-fold. Another factor which would be expected to affect the exchange rate is the mole fraction of strong electron-releasing groups, e.g., methyl. The polymers selected containing the butene-2 group having the larger mole fraction (0.343 as compared to 0.300) of methyl groups, which effect alone would be to decrease the rate of regeneration, giving this polymer a slight disadvantage in the comparison.

The following preparation of 1,4-bis-(diallylamino)-butene-2 will illustrate the general procedure used for preparation of derivatives of 1,4-diaminobutene-2: One mole (125 g.) of 1,4-dichlorobutene-2 was dissolved in 300 ml. of dry benzene in a three-neck flask equipped with mechanical stirrer, reflux condenser and addition funnel. Diallylamine (194 g., 2 moles) was added dropwise. Stirring at room temperature was continued for 48 hours. A saturated solution of sodium hydroxide (200 g.) was added to the flask and the benzene layer then removed and dried over solid sodium hydroxide. The benzene was removed and the amine distilled at 102° under a pressure of 0.8 mm. The product weighed 167.7 g.; yield, 68%, $n_D^{25}$ 1.4820, $d_4^{25}$ 0.8647.

*Analysis.*—Calculated for $C_{16}H_{26}N_2$: N, 11.37. Found: N, 11.45.

1,4-bis-(dimethylamino)-butene-2 and 1,4-bis-(diethylamino)-butane-2 were prepared by methods previously described or slight modifications thereof.

Two general procedures were used for preparation of the quaternary ammonium salts: Method I—The following preparation of 1,4-bis-(triallylammonium)-butene-2 dibromide will illustrate this method: one-half mole (123.2 g.) of 1,4-bis-(diallylamino)-butene-2 was dissolved in 150 ml. of dry acetophenone, and allyl bromide (121 g., 1 mole) was added dropwise with stirring. The reaction flask was cooled, as necessary, in ice-water. After the addition of the allyl bromide was complete, the reaction was stirred for one hour. Diisopropyl ether was added and the white, hygroscopic solid filtered and washed twice with dry diisopropyl ether. The product, after drying in a vacuum desiccator for several hours, weighed 244.2 g. The yield was quantitative.

Method II—The following preparation of 1,4-bis-(triallylammonium)-butene-2 dibromide will illustrate this method: Eight grams (0.0373 mole) of 1,4-dibromobutene-2 was dissolved in 10 ml. of dry acetone and triallylamine (10.2 g., 0.0746 mole) was added dropwise with stirring. After a short time a viscous liquid separated. Within an hour, the viscous liquid had turned to a fine, white, hygroscopic solid. This solid was washed well with dry diisopropyl ether and dried in a vacuum desiccator. The dry product weighed 15.5 g.; yield 85.3%.

In addition to 1,4-bis-(triallylammonium)-butene-2 dibromide, 1,4-bis-(allyldimethylammonium)-butene-2 dibromide, 1,4-bis-(allyldiethylammonium)-butene-2 dibromide, 1,4-bis-(diallylmethylammonium)-butene-2 dibromide, 1,4-bis-(diallylmethylammonium)-butene-2 dichloride, 1,4-bis-(aliyldimethylammonium)-butene-2 dichloride, and 1,4-bis-(triallylammonium)-butene-2 dichloride were prepared.

EXAMPLE 1

*Polymer of 1,4-bis-(triallylammonium)-butene-2 dibromide*

Fourteen grams of 1,4-bis-(triallylammonium)-butene-2 dibromide, 0.168 g. of t-butyl hydroperoxide, and 1.03 g. of water were well mixed in a beaker and placed in an oven at 65° for 24 hours. The polymer was light tan and water insoluble. Twelve grams of the material was obtained. The yield was 86%. The 20–60 mesh resin weighed 6.1 g. and had a dry volume of 13.2 ml. and a settled wet volume of 18.2 ml. The swelling coefficient (wet volume divided by the dry volume) was 1.38.

EXAMPLE 2

*Polymer of 1,4-bis-(diallylmethylammonium)-butene-2 dibromide*

One gram of 1,4-bis-(diallylmethylammonium)-butene-2 dibromide, 0.012 g. of t-butyl hydroperoxide, and 0.1 g. of water were well mixed in a beaker and placed in an oven at 65° for 12 hours. At the end of this time, 0.024 g. of catalyst was added and the mixture allowed to remain in the oven for an additional 24 hours. The polymer was light tan and water insoluble. The dry resin weighed 0.6 g. The yield was 60%.

EXAMPLE 3

*Copolymer of 1,4-bis-(allyldiethylammonium)-butene-2 dibromide and tetraallylammonium bromide*

Nine grams of 1,4-bis-(allyldiethylammonium)-butene-2 dibromide, 3 g. of tetraallylammonium bromide, 0.0144 g. of t-butyl hydroperoxide, and 0.42 g. of water were well mixed in a beaker and placed in an oven at 65° for 22 hours. The copolymer was a tan, water-insoluble solid. Ten grams of the resin was obtained giving a yield of 83.3%. After grinding and sizing, 6.4 g. of 20–60 mesh polymer was obtained. This material had a dry volume of 10 ml. and a settled wet volume of 26 ml. The swelling coefficient was 2.6.

EXAMPLES 4, 5, 6, 7

*Copolymers of 1,4-bis-(triallylammonium)-butene-2 dibromide and 1,4-bis-(allyldimethylammonium)-butene-2 dibromide*

Four copolymers of these two salts were made. The molar ratio of the two components was varied (1 to 9; 2 to 8; 3 to 7; and 4 to 6).

(1) 1,4-bis-(triallylammonium)-butene-2 dibromide (0.49 g., 0.001 mole), 1,4-bis-(allyldimethylammonium)-butene-2 dibromide (3.469 g. 0.009 mole), and enough water to make a clear solution, were mixed well and then 0.048 g. of t-butyl hydroperoxide was stirred in. The mixture, in a beaker, was placed in an oven at 50° for 24 hours, then at 65° for 24 hours, and finally at 75° for 24 hours. The copolymer was a light tan, water-insoluble solid. The dry resin weighed 3.4 g. giving a yield of 85%. The copolymer was ground to 20–60 mesh. This material weighed 3.2 g., and had a dry volume of 5.0 ml. and a settled wet volume of 13.0 ml. The swelling coefficient was 2.6.

(2) 1,4-bis-(triallylammonium)-butene-2 dibromide (7.33 g., 0.015 mole), and 1,4-bis-(allyldimethylammonium)-butene-2 dibromide (23 g., 0.06 mole), were mixed with enough water to give a clear solution. The t-butyl hydroperoxide (0.18 g.) was stirred in and the mixture placed in an oven at 50° for 24 hours, then at 65° for 24 hours, and finally at 75° for 24 hours. The copolymer was a light tan, water-insoluble solid. The dry resin weighed 15.4 g. The yield was 50.8%. The 20–60 mesh material weighed 13.0 g. and had a dry volume of 21 ml. and a settled wet volume of 72.8 ml. The swelling coefficient was 3.46. It should be noted here that the catalyst to quaternary ammonium salt ratio is one-half the usual value.

(3) 1,4-bis-(triallylammonium)-butene-2 dibromide (10.98 g., 0.0225 mole), and 1,4-bis-(allyldimethylammonium)-butene-2 dibromide (20.2 g., 0.0525 mole) were mixed with enough water to give a clear solution. The t-butyl hydroperoxide (0.18 g.) was stirred in and the mixture, in a beaker, placed in an oven at 50° for 24 hours, then at 65° for 24 hours, and finally at 75° for 24 hours. The polymer was a tan, water-insoluble solid. The dry resin weighed 15.8 g. The yield was 50.5%. The 20–60 mesh material weighed 15.4 g. and had a dry volume of 24 ml. and a settled wet volume of 75 ml. The swelling coefficient was 3.12. It should be noted here that the catalyst to quaternary ammonium salt ratio is one-half the usual value.

(4) 1,4-bis-(triallylammonium)-butene-2 dibromide (14.65 g., 0.030 mole) and 1,4-bis-(allyldimethylammonium)-butene-2 dibromide (17.3 g., 0.045 mole) was mixed with enough water to give a clear solution. The t-butyl hydroperoxide (0.18 g.) was stirred in and the mixture, in a beaker, placed in an oven at 50° for 24 hours, then at 65° for 24 hours, and finally at 75° for 24 hours. The copolymer was a tan, water-insoluble solid. The dry resin weighed 17.9 g. The yield was 55%. The 20–60 mesh material weighed 16.1 g. and had a dry volume of 25.5 ml. and a settled wet volume of 63.2 ml. The swelling coefficient was 2.48. It should be noted here that the catalyst to quaternary ammonium salt ratio is one-half the usual value.

The capacities of these resins varied from 2.26 milliequivalents per gram to 3.89 milliequivalents per gram. These values are considerably higher than ion exchange resins of the quaternary ammonium type now on the market.

All of the resins obtained through polymerization or copolymerization of compounds containing the butene-2 double bond were found to undergo regeneration much more readily than other similar resins not containing this residual double bond. For example, a comparison was made in the regeneration rates of the copolymer (L) of 1,4-bis-(triallylammonium)-butene-2 and 1,4-bis-(allyldimethylammonium)-butene-2 in a molar ratio of 4:6 and a copolymer (P) of triallylmethylammonium bromide and diallyldimethylammonium bromide in a molar ratio of 3:1. Copolymer L which contains 0.143 mole fraction of butene-2 groups, 0.343 mole fraction of methyl groups, and swelling coefficient of 2.48 has a higher regeneration rate (exchange of hydroxyl ion for bromide ion) than copolymer P, which contains no residual double bonds, 0.300 mole fraction of methyl groups, and swelling coefficient of 2.62. Plots of the two regeneration curves on two cycle semilog paper, bromide ion concentration vs. time, shows that the exchange follows approximately first order reaction rates, and that the time required for exchange of one-half of the bromide ion originally present at flow rates of 5 ml. per minute, was found to be twelve minutes for copolymer L, as compared to twenty-four minutes for copolymer P.

We claim:

1. A cross-linked water insoluble polymer of 1,4-bis-(triallylammonium)-butene-2 dibromide suitable for use as an ion exchange resin capable of more rapid regeneration rates and characterized by polymerization and cross-linking through the ethylenic double bonds of the allyl groups, the butene double bond remaining intact.

2. A cross-linked, water insoluble polymer of 1,4-bis-(methyldiallylammonium)-butene-2 dibromide suitable for use as an ion exchange resin capable of more rapid regeneration rates and characterized by polymerization and cross-linking through the ethylenic double bonds of the allyl groups, the butene double bond remaining intact.

3. A cross-linked, water insoluble polymer of 1,4-bis-(methyldiallylammonium)-butene-2 dichloride suitable for use as an ion exchange resin capable of more rapid regeneration rates and characterized by polymerization and cross-linking through the ethylenic double bonds of the allyl groups, the butene double bond remaining intact.

4. A cross-linked, water insoluble copolymer of mixture of 10% to 90% of 1,4-bis-(allyldimethylammonium)-butene-2 dibromide and 90% to 10% tetraallylammonium bromide, suitable for use as an ion exchange resin capable of more rapid regeneration rates and characterized by polymerization and cross-linking through the ethylenic double bonds of the allyl groups, the butene double bond remaining intact.

5. A cross-linked, water insoluble copolymer of a mixture of 10% to 90% of 1,4-bis-(allyldiethylammonium)-butene-2 dibromide and 90% to 10% tetraallylammonium bromide suitable for use as an ion exchange resin capable of more rapid regeneration rates and characterized by polymerization and cross-linking through the ethylenic double bonds of the allyl groups, the butene double bond remaining intact.

6. A cross-linked, water insoluble copolymer of a mixture of 10% to 90% 1,4-bis-(allyldimethylammonium)-butene-2 dichloride and 90% to 10% tetraallylammonium chloride suitable for use as an ion exchange resin capable of more rapid regeneration rates and characterized by polymerization and cross-linking through the ethylenic double bonds of the allyl groups, the butene double bond remaining intact.

7. A cross-linked, water insoluble copolymer of a mixture of 10% to 90% of 1,4-bis-(allyldimethylammonium)-butene-2 dibromide and 90% to 10% of 1,4-bis-(triallylammonium)-butene-2 dibromide suitable for use as an ion exchange resin capable of more rapid regeneration rates and characterized by polymerization and cross-linking through the ethylenic double bonds of the allyl groups, the butene double bond remaining intact.

8. A cross-linked, water insoluble copolymer of a mixture of 10% to 90% of 1,4-bis-(allyldimethylammonium)-butene-2 dichloride and 90% to 10% of 1,4-bis-(triallylammonium)-butene-2 dichloride suitable for use as an ion exchange resin capable of more rapid regeneration rates and characterized by polymerization and cross-linking through the ethylenic double bonds of the allyl groups, the butene double bond remaining intact.

9. A cross-linked, water insoluble polymer of 1,4-bis-(triallylammonium)-butene-2 dichloride suitable for use as an ion exchange resin capable of more rapid regeneration rates and characterized by polymerization and cross-linking through the ethylenic double bonds of the allyl groups, the butene double bond remaining intact.

10. Cross-linked, water insoluble polymers of symmetrically-substituted quaternary ammonium salts of the structure:

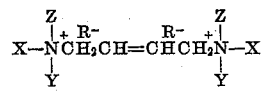

wherein X is an allyl radical, Y and Z are selected from the group consisting of lower alkyl and allyl radicals, and R⁻ is selected from the group consisting of chloride and bromide ion, said polymers being suitable for use as ion exchange resins capable of rapid regeneration rates and being characterized by polymerization and cross-linking through the ethylenic double bonds of the allyl groups, the butene double bonds remaining intact, the said polymers being selected from the group consisting of the homopolymers of said salts, and the copolymers of said salts with different ethylenically unsaturated aliphatic quaternary ammonium compounds.

References Cited in the file of this patent
UNITED STATES PATENTS

| | | |
|---|---|---|
| 2,440,724 | Morey | May 4, 1948 |
| 2,525,777 | Benneville | Oct. 17, 1950 |
| 2,565,488 | Finch | Aug. 28, 1951 |

OTHER REFERENCES

Butler et al.: J. American Chem. Soc., 71, pages 3120–3122, 1949.

Butler et al.: J. American Chem. Soc., 76, pages 713–714, 1954.

Butler et al.: J. Am. Chem. Soc., 74, 2543–7 (May 1952).